United States Patent [19]

Nagy et al.

[11] Patent Number: 5,528,314
[45] Date of Patent: Jun. 18, 1996

[54] TRANSPARENT VEHICLE WINDOW ANTENNA

[75] Inventors: Louis L. Nagy, Warren; Mark Bellinger, Dearborn Heights; Douglas C. Martin, Warren, all of Mich.

[73] Assignees: General Motors Corporation, Detroit, Mich.; Delco Electronics Corporation, Kokomo, Ind.

[21] Appl. No.: 445,884

[22] Filed: May 22, 1995

[51] Int. Cl.$^6$ ..................................... H01Q 1/32
[52] U.S. Cl. .......................... 348/713; 343/711
[58] Field of Search ................ 343/713, 704, 343/767, 769, 711, 712; H01Q 1/32

[56] References Cited

U.S. PATENT DOCUMENTS

| | | | |
|---|---|---|---|
| 4,768,037 | 8/1988 | Inaba et al. | 343/713 |
| 4,849,766 | 7/1989 | Inaba et al. | 343/713 |
| 4,864,316 | 9/1989 | Kaoru et al. | 343/704 |
| 4,866,453 | 9/1989 | Nagy et al. | 343/712 |
| 5,005,020 | 4/1991 | Ogawa et al. | 343/713 |
| 5,012,255 | 4/1991 | Becker | 343/704 |
| 5,017,933 | 5/1991 | Sakurai et al. | 343/704 |
| 5,083,135 | 1/1992 | Nagy et al. | 343/713 |
| 5,355,144 | 10/1994 | Walton et al. | 343/713 |

Primary Examiner—Hoanganh Le
Attorney, Agent, or Firm—Robert M. Sigler

[57] ABSTRACT

A vehicle antenna comprises a transparent, electrically conducting, film between the inner and outer glass sheets of a vehicle window. The film comprises a horizontally elongate principal element substantially parallel to and spaced from the upper edge portion of the window aperture and having an effective horizontal length of an odd multiple of one quarter of a predetermined wavelength and an impedance matching element. The impedance matching element comprises a main portion having a peripheral edge with a horizontal upper portion spaced below the principal element and a remainder spaced from the remaining edge portion of the window aperture so as to form a slot transmission line having an effective length of one half the wavelength, which is preferably in the commercial FM band. The impedance matching element further comprises a narrow vertical portion connecting the main portion to the principal element, so that the slot transmission line is parasitically coupled to the principal element. The impedance matching element covers substantially the entire main viewing area of the window, especially if its upper edge is overlapped by an upper dark tinted region of the window. Thus, (1) the antenna more commercially acceptable due to the uniform appearance of the window, (2) the antenna has superior AM band gain due to its large size, and (3) the film may be effectively provided with an infrared reflecting substance for internal vehicle temperature reduction.

4 Claims, 3 Drawing Sheets

TRANSPARENT VEHICLE WINDOW ANTENNA

BACKGROUND OF THE INVENTION

U.S. Pat. No. 5,083,135, issued 21 Jan. 1992, describes a transparent film antenna for a vehicle window in the shape of a "T", with a horizontally elongate principal element spaced from and parallel to the horizontal upper edge of the window aperture and a vertically elongate impedance matching element extending down the window from the center of the principal element. The fill comprises a transparent, electrically conducting material and is disposed between the sheets of glass in a composite glass windshield. The antenna as described in the patent provides satisfactory performance in the commercial AM and FM broadcasting bands and can be adapted for television and/or telephone bands.

The antenna described above performs well, but its presence in the windshield of a vehicle affects the vehicle's appearance and therefore its commercial acceptance. Although the antenna film is generally transparent to visible light, it can appear to an observer to be different in color from the rest of the windshield, due to light diffraction effects. The horizontal principal element is placed in an upper, dark tinted region of a vehicle window to reduce its visibility; but the vertical impedance matching element projects downward into the lighter tinted or un-tinted region of the window; and some may consider the color difference in this portion of the windshield to be visually objectionable.

SUMMARY OF THE INVENTION

The present invention provides an antenna comprising a transparent, electrically conducting film in a vehicle window glass. The film comprises a horizontally elongate principal element as in the "T" shaped antenna of the prior art described above, which is substantially parallel to and spaced from the upper edge portion of the window aperture and has an effective horizontal length of an odd multiple of one quarter wavelength of a predetermined radio wave to be received. The film further comprises an impedance matching element which is modified from that of the prior art to form an enlarged main portion and a narrow vertical portion connecting the main portion to the principal element. The main portion has a peripheral edge with a horizontal upper portion spaced below the principal element by an amount sufficient that no significant slot transmission line is formed therewith and a remainder spaced from the remaining edge portion of the window aperture so as to form a slot transmission line therewith. The slot transmission line has an effective length which is a multiple of one half the wavelength to which the principal element is tuned and is parasitically coupled to the principal element.

The impedance matching element provides a uniform, and therefore less objectionable, appearance over most of the main viewing area of the window. The parasitically coupled slot transmission line formed between the impedance matching element and the edge of the window aperture permits adjustment of the antenna impedance by choice of the slot width. If the window is to be provided with an upper dark tinted region, the principal element and upper peripheral edge of the impedance matching element may be hidden within this region for a further improvement in appearance.

An additional advantage of the antenna is superior commercial AM radio performance. The wavelength to which the principal element of the antenna is tuned is generally in the commercial FM band; at the longer wavelengths of the commercial AM band, the antenna is essentially a capacitive antenna. Due to the large area of the antenna, the capacitive performance at commercial AM wavelengths is superior to most other vehicle antennas. This allows greater design choices to the antenna designer for a particular vehicle, since some of the superior performance at commercial AM wavelengths can be traded off, if necessary, for improved performance at commercial FM or other wavelengths.

Yet another advantage of the antenna may be obtained if a reduction in infrared radiation transmission through the window is desired, since the antenna film may be provided with at least one infrared blocking substance or layer that provides a uniform appearance across substantially the entire window outside the upper dark tinted region. Many infrared reflecting films used on vehicle windows contain an electrically conductive substance which, if the infrared reflective film and a separate conductive film antenna of the prior art were combined in the same window, would reduce antenna performance to unacceptable levels. However, the antenna of this invention permits the addition of infrared reflecting material to the antenna itself so as to provide an infrared reflecting substance to the window in a visually acceptable manner without reducing antenna performance.

Further details and advantages of this invention will be apparent from the accompanying drawings and following description of a preferred embodiment.

DESCRIPTION OF A PREFERRED EMBODIMENT

Figure 1:
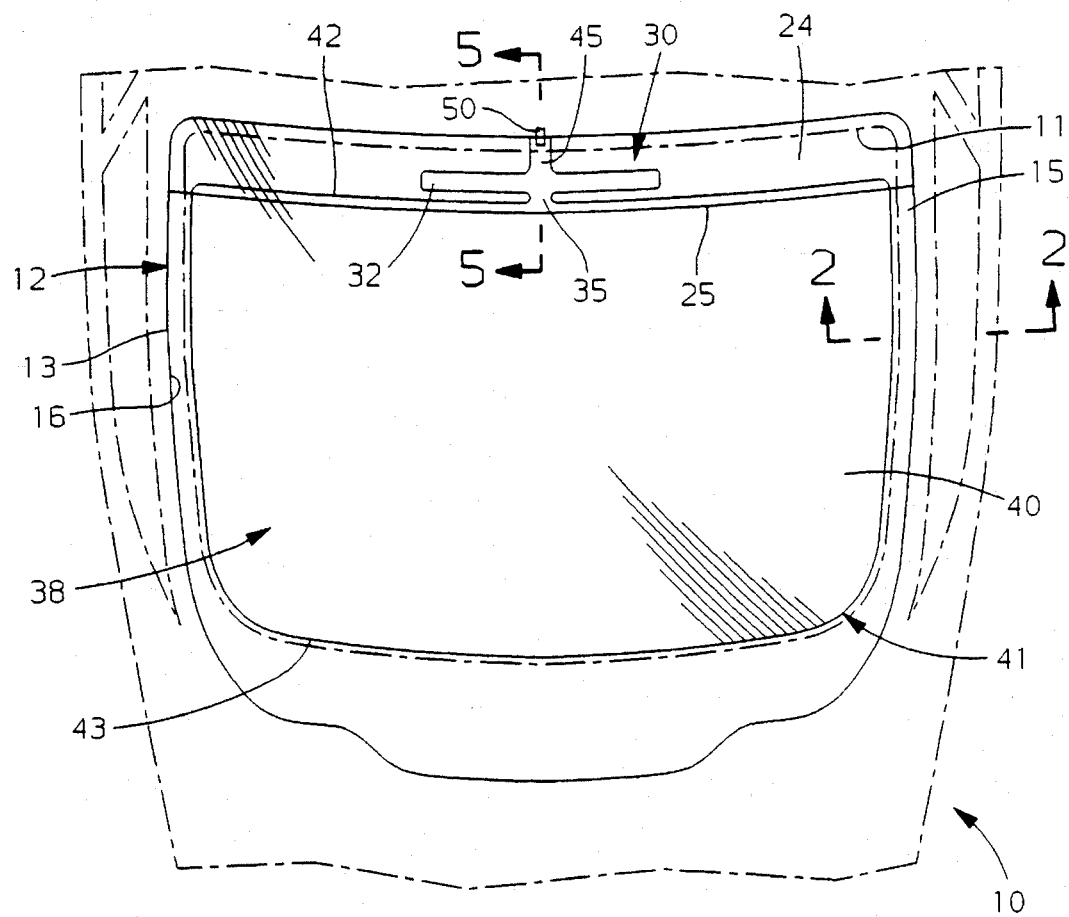
FIG. 1 shows a vehicle with a window provided with an antenna according to the invention.
Figure 2:
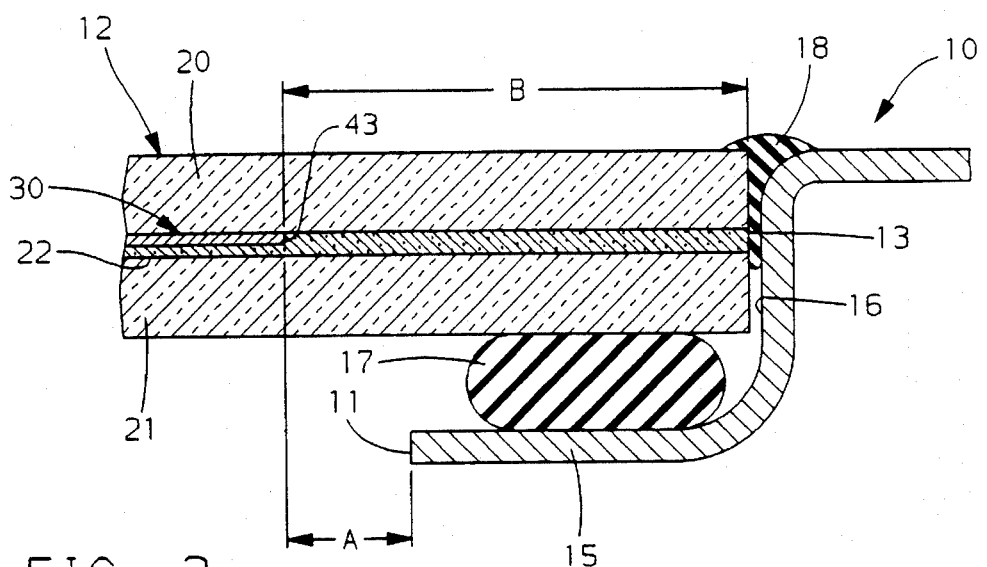
FIG. 2 shows a section view along lines 2—2 in FIG. 1.

FIGS. 1 and 2 show a portion of a vehicle body 10 made of an electrically conducting metal such as steel or aluminum and having a window aperture defined by body window edge 11. A window glass 12 overlaps body window edge 11 around its periphery to provide, in this embodiment, a windshield for vehicle body 10. The outer edge 13 of windshield 12 overlaps a depressed annular flange region 15 of body 10 defined between body window edge 11 and a retaining wall 16 which connects depressed flange 15 to the remainder of body 10 and retains windshield 12 flush with the remainder of body 10 in a predetermined position relative to body window edge 11. As seen in FIG. 2, an annular sealing member 17 is placed between window glass 12 and depressed annular flange region 15 of body 10; and an annular molding 18 bridges the outer gap between vehicle body 10 and window glass 12; these elements are of standard material and construction and are omitted from FIG. 1 to avoid unnecessary clutter.

As seen in FIG. 2, windshield 12 is a standard laminated vehicle windshield formed of outer layer 20, preferably of glass, and inner layer 21, preferably of glass, with an interposed layer 22, preferably of a standard polyvinyl butyryl or similar thermoplastic material. Windshield 12 may be provided with a horizontal dark tinted region 24 across the top thereof, defined by its lower border 25 in FIG. 1; and this dark tinted region, although commonly used in windshields for light and glare reduction, may be advantageously utilized in this invention to render the principal element of the antenna less visible.

An antenna 30 is provided in windshield 12 as a film applied to the inner surface of the outer layer 20 of windshield 12 so as to be contained between layers 20 and 21 of windshield 12, as shown in exaggerated width in FIG. 2. The film of antenna 30 is essentially transparent to visible light, highly reflective of infrared radiation, and electrically conducting, preferably with a sheet resistance of 4 ohms per square or less. An example of a suitable film is described in U.S. Pat. No. 4,898,789 to Finley, issued Feb. 6, 1990, which film comprises a first anti-reflective metal oxide layer such as oxide of zinc and tin, an infrared reflective metal layer such as silver, a primer layer containing titanium, a second metal oxide layer, another infrared reflective metal layer such as silver, an additional primer layer, a third anti-reflective metal oxide layer and, preferably, an exterior protective layer of titanium metal or titanium oxide. This film was designed for infrared reflection; but it is also electrically conducting and, with some adjustment of physical characteristics such as metallic concentrations or layer thicknesses, appears to be capable of the desired 4 ohm per square or less sheet resistance.

Antenna 30 is a planar antenna of substantially constant thickness and substance across its planar shape; and its reception or radiating characteristics are greatly affected by its planar shape. The antenna may be described as comprising two basic elements. The first of these is a principal element substantially similar to the principal element of the referenced U.S. Pat. No. 5,083,135: a horizontally elongate principal element 32 substantially parallel to and spaced from the horizontal upper portion of body window edge 11. Principal element 32 is essentially rectangular, although its horizontal edges may follow any slight curvature of the upper portion of body window edge 11 and its corners may be rounded for a more pleasing appearance. Principal element 32 is a tuned element having an effective horizontal length of an odd integer multiple of one quarter (¼) of the wavelength to which it is tuned, whereby it exhibits a zero reactive impedance at the tuned wavelength. In this embodiment, which is designed for commercial radio reception in the U.S.A., principal element 32 is tuned to a wavelength in the center of the commercial FM broadcasting band, such as three meters and thus has an effective horizontal length of about 0.75 meters. As with the antenna of U.S. Pat. No. 5,083,135, however, it has been found that the physical length of element 32 at resonance is somewhat shorter than a measured one quarter of the actual mid-band signal wavelength. It is believed that this is due to coupling with the vehicle body; and the length by which it is shorter will vary with the specific vehicle application. In one such vehicle, principal element 32 has been found to work well with an actual horizontal length of 60 cm and a vertical width of 50 mm. It is ideally spaced below the horizontal upper portion of body window edge 11 by a distance which provides maximum FM gain; but this distance may be compromised to gain other advantages, as described below, for a particular vehicle design.

The second element of antenna 30 is a an impedance matching element 38 having a main portion 40 which covers substantially all or most of windshield 12 below dark tinted region 24 and thus most or all of the main viewing area of windshield 12. Main portion 40 of impedance matching element 38 has a peripheral edge 41 with a horizontal upper portion 42 spaced at least 25 mm below the lower edge of principal element 32 so as to minimize transmission coupling effects therebetween and is connected thereto for electrical current flow by a narrow vertical portion 35. Upper portion 42 of peripheral edge 41 is preferably within dark tinted region 24 of windshield 12 along its entire length from close to one side to close to the other side of windshield 12, so that dark tinted region 24 overlaps the main portion 40 of impedance matching element 38. This is desirable for the sake of vehicle appearance, so that the non-tinted or lightly tinted area of windshield 12 below dark tinted region 24 will have a uniform appearance. However, this is a factor which may produce the compromise in the vertical position of principal element 32 as described above, due to design or governmental limits in the vertical extent of dark tinted region 24 below windshield edge 11. In one specific design, an ideal spacing of about 11.5 cm from principal element 32 to the upper portion of body window edge 11 is compromised to a closer 9 cm spacing with a resulting slight decrease in FM gain.

The remainder 43 of peripheral edge 41 of impedance matching element 38 is spaced a distance "A", as seen in FIG. 2, from body window edge 11 so as to provide, in combination therewith, a planar slot transmission line which is parasitically coupled to principal element 32. To this end, gap width "A" is preferably within the range 10–25 mm. The length of the slot is substantially an integer multiple of one half of the wavelength to which principal element 30 is tuned, so that each end of the slot transmission line, at the junctions of upper portion 42 and remainder 43 of peripheral edge 41, appears as an electrical open circuit. In this embodiment, with a large windshield, this length is one full wavelength, which for the middle of the commercial FM frequency band, is approximately 3 meters. Impedance matching element 38 is used to adjust the real component of the antenna's impedance to match the characteristic impedance, typically 125 ohms, of the coaxial cable used to feed the antenna; and this is accomplished by the proper choice, within the range 10–25 mm, for the width "A" of the gap between the remainder 43 of peripheral edge 41 of impedance matching element 38 and the adjacent portion of body window edge 11. For appearance, and to maximize the infrared reflecting efficiency of the windshield, a dark, opaque, painted band, not shown but of width "B" as indicated in FIG. 2, may be provided around the sides and bottom of window glass 12 to substantially or completely cover the area outward from the remainder 43 of peripheral edge 41 of impedance matching element 38 to the outer edge 13 of window 12. This band can be broken into dots of decreasing size toward its inner boundary for a fade-out effect as is known in the industry. If such a band is provided, together with the dark tinted region at the top of the windshield, substantially the entire viewing area of windshield 12 can be uniformly provided with the infrared reflecting film of antenna 30.

Impedance matching element 38, in addition to providing infrared radiation reflection over substantially all the lighter tinted portion of the windshield and impedance matching for greater gain at commercial FM wavelengths, provides an additional benefit at commercial AM wavelengths. At such longer wavelengths, antenna 12 is not a resonant antenna but is substantially a capacitive antenna; and the large area of impedance matching element 38 provides a substantial boost in gain for antenna 12, as compared with similar planar and other antennas of the prior art. In fact, the boost in AM gain is so great that some of it can be sacrificed, if desired, in fine tuning antenna performance for further improvements in FM gain, directional response, or other characteristics, while still yielding good AM performance.

Figure 5:
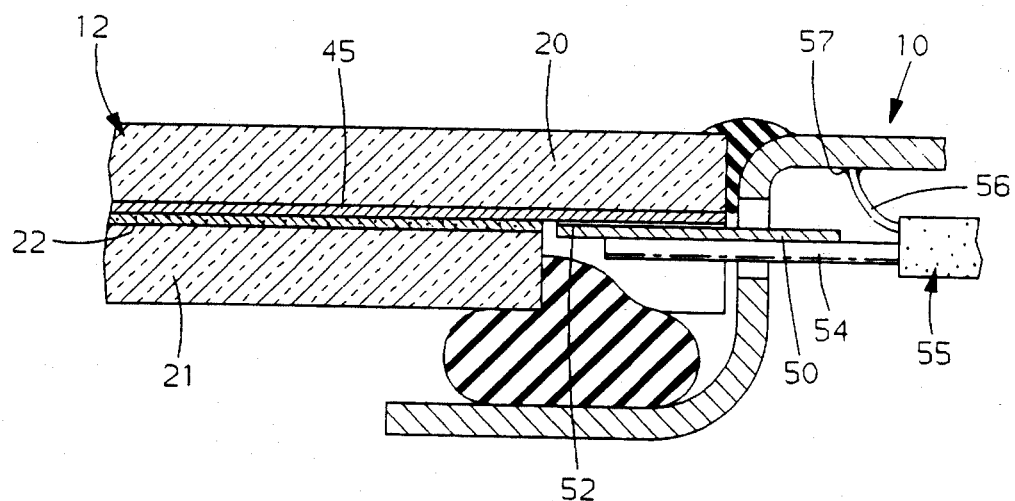
FIG. 5 is a section view along lines 5—5 in FIG. 1.
Figure 6:
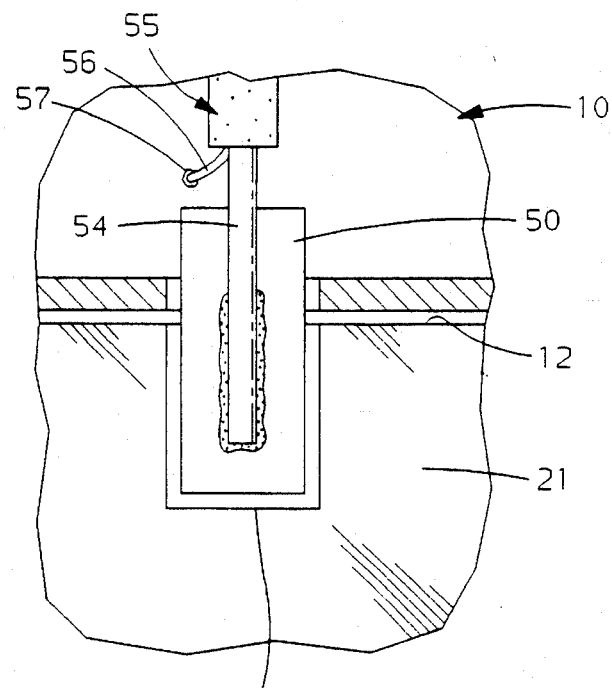
FIG. 6 is an enlarged view of a coaxial cable coupling arrangement for the antenna of FIGS. 1, 2 and 5.

In order to connect antenna 30 to a radio or similar communication device, a connection arrangement is provided for an external coaxial cable. In the embodiment of FIG. 1, the film of antenna 30 is extended in a narrow strip 45, about 25 mm wide, upward from the center of principal element 32 almost to (1 mm from) the upper edge of windshield 12. As shown in FIGS. 5 and 6, a portion of inner glass layer 21 is removed to expose about 12 mm (by 25 mm wide) of the end of strip 45. A length of conductive tape 50 soldered to the inner wire 54 of a coaxial cable 55 is affixed by adhesive 52 to the exposed section of strip 45. The adhesive may be electrically insulating or electrically conducting. The outer conductor 56 of coaxial cable 55 is affixed to body 10, for example by a rivet 57, at a convenient point close to body window edge 11.

The electrically insulating adhesive provides an AC coupling between coaxial cable 55 and antenna 30. The adhesive is less expensive; and the coupling is easier to achieve; but the superior antenna AM gain is reduced due to the small coupling area (12×25 mm), and removal of more glass to obtain a larger area is not considered desirable. A DC coupling achieves good gain with a small contact area between the copper tape and strip 45 but requires the establishment of electrical contact through the top protective layer of the film, which is an electrical insulator. The suspended silver particles of the conductive adhesive will provide such electrical contact if the top layer is removed to expose a conductive layer. It has also been found that, under certain conditions, they will provide electrical contact even if the top layer is not removed. It is believed that the particles can be pressed through a thin insulating layer to establish electrical contact during manufacture.

Figure 7:
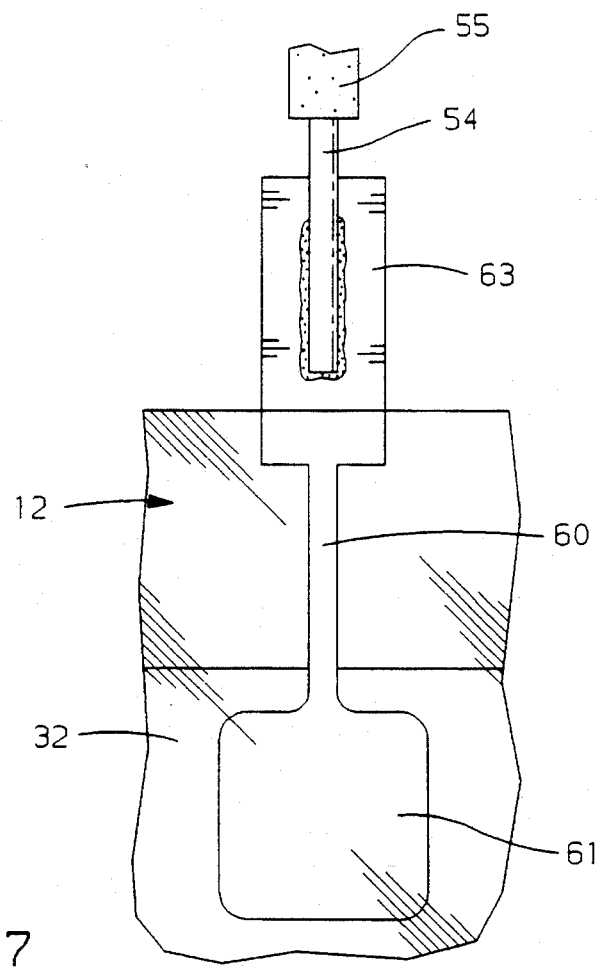
FIG. 7 is an enlarged view of an alternate embodiment of a coaxial cable coupling arrangement for the antenna of FIGS. 1 and 2.

An alternate coupling arrangement is shown in FIG. 7, which looks through an upper middle portion of windshield 12. In this embodiment, a thin connecting strip 60, made from an electrically conducting metal such as stainless steel, is inserted between glass layers 20 and 21, against the inner surface of glass layer 20, during manufacture of windshield 12. A portion of connecting strip 60, contact pad 61, is affixed to principal element 32 in a manner similar to that shown and described with reference to FIGS. 5 and 6, either by non-conducting adhesive for AC coupling or by conducting adhesive for DC coupling. The 18 mm square size and shape of contact pad 61 provides a contact area similar to that of the arrangement shown in FIGS. 5 and 6. Contact pad 61 is joined by a narrow connecting portion 60 to a wider terminal portion 63 which projects outward from the upper edge of windshield 12. The inner conductor 54 of coaxial cable 55 is soldered to terminal portion 63 as shown; while the outer connector, not shown in this Figure, of coaxial cable 55 may be connected to body 10 as in the arrangement of FIGS. 5 and 6.

Figure 3:
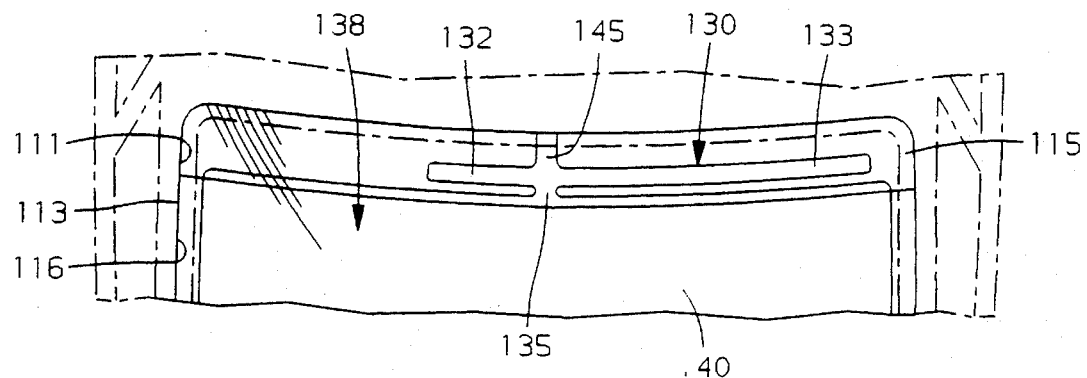
FIGS. 3 and 4 show portions of antennas which are variations of the antenna of FIG. 1.

A variation 130 of the antenna of FIGS. 1 and 2 is shown in FIG. 3. In this embodiment, only principal element 132 differs from the corresponding element 32 in FIG. 1; the other elements shown in FIG. 3 are identical to the similarly numbered elements in the embodiment of FIGS. 1 and 2. Even with principal element 132, the only difference is that it is longer and asymmetrical with respect to the center of windshield 12, with a side 133 which projects almost to the side edge of the windshield (although not as close to the edge as impedance matching element 138. This embodiment may be coupled to a coaxial cable by any of the arrangements shown in or described with respect to FIGS. 5–7. This variation of the antenna can provide up to one dB improved FM gain if its asymmetrical appearance is commercially acceptable.

Figure 4:
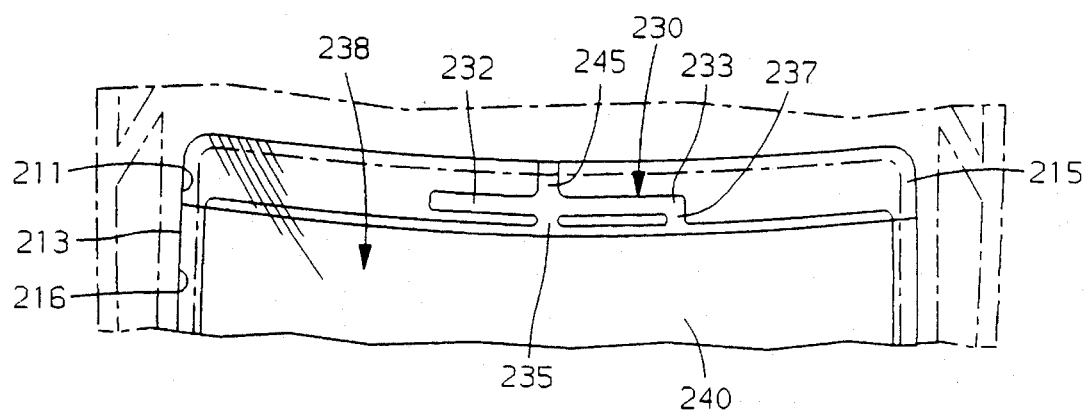

Another variation of the antenna of FIGS. 1 and 2 is shown in FIG. 4. As in the embodiment of FIG. 3, only principal element 232 of FIG. 4 differs from the corresponding element 32 of FIGS. 1 and 2; and all other elements are identical. In this embodiment, the end 233 of one side of element 232 is connected to impedance matching element 238 by a connecting link 237. This embodiment may be coupled to a coaxial cable by any of the arrangements shown in or described with respect to FIGS. 5–7. This variation of the antenna can provide a slight improvement in AM gain if its asymmetrical appearance is commercially acceptable.

We claim:

1. A transparent vehicle window antenna for receiving radio waves of a predetermined wavelength in a vehicle having an electrically conducting structure forming a window aperture with a window glass disposed therein, the aperture having an edge with a horizontal upper edge portion and a remaining edge portion, the antenna comprising a transparent, electrically conducting, film in the window glass, the film comprising a horizontally elongate principal element substantially parallel to and spaced from the upper edge portion of the window aperture and having an effective horizontal length of an odd multiple of one quarter of the wavelength and an impedance matching element extending downward from the principal element, the impedance matching element comprising:

a main portion having a peripheral edge with a horizontal upper portion spaced below the principal element by an amount sufficient that no significant slot transmission line is formed therewith and a remainder spaced from the remaining edge portion of the window aperture so as to form a slot transmission line therewith, the effective length of the slot transmission line being a multiple of one half the wavelength; and a narrow vertical portion connecting the main portion to the principal element, the slot transmission line being parasitically coupled thereby to the principal element.

2. A vehicle antenna according to claim 1 in which the window glass is provided at the upper end thereof with a dark tinted region which overlaps the main portion of the impedance matching element.

3. A vehicle antenna according to claim 1 in which the film further comprises an infrared reflecting substance.

4. A vehicle antenna according to claim 1 in which the predetermined wavelength is in approximately the middle of the commercial FM broadcasting band.

* * * * *